Patented Aug. 11, 1931

1,818,510

UNITED STATES PATENT OFFICE

ROBERT FRASER THOMSON AND JOHN THOMAS, OF GRANGEMOUTH, SCOTLAND, ASSIGNORS TO SCOTTISH DYES, LIMITED, OF GRANGEMOUTH, SCOTLAND

MANUFACTURE OF DYESTUFFS AND INTERMEDIATES

No Drawing. Application filed August 31, 1927, Serial No. 216,790, and in Great Britain September 24, 1926.

This invention relates to the production of dyestuff intermediates and dyestuffs produced therefrom.

The principal object of the invention is to provide improved or modified processes for producing such intermediates.

In the specification of British Letters Patent No. 251313, we have described especially in Example 5 the production of dibenzanthrone of a high degree of purity by condensation in the presence of alkali of a dibenzanthronyl body prepared according to other examples of that specification by the oxidation of benzanthrone in sulphuric acid solution.

In British specification No. 278112 which was not published prior to the date of the British application on which the present case is based, there are described processes which include the treatment of benzanthrone in sulphuric acid solution with an oxidizing agent, for example, manganese oxide at low temperatures for instance about 0° C. and to such a degree as to yield a substantial proportion of a dibenzanthronyl body this body then being fused with alkali for the purpose of preparing dibenzanthrone of a high degree of purity. In British specification No. 278834 subsequent to the last mentioned British specification there is described a process for the production of colouring matters which consists in the halogenation of dibenzanthrone of a high degree of purity prepared from dibenzanthronyl by the methods of British specifications Nos. 251313 or 278112.

According to the present invention dibenzanthrone which may if desired be prepared from a dibenzanthronyl according to either of the preceding two paragraphs is halogenated at least to the dichlor stage and the halogenated dibenzonthrone thus obtained is condensed with a glycol.

The invention in brief consists in halogenating at least to the dichlor stage dibenzanthrones according to the process of British specification No. 278834 and submitting the products to condensation with glycols.

The invention also consists in processes substantially as herein described and in products which can be prepared by those processes.

The following examples illustrates how the invention may be carried into effect, references to all parts being to parts by weight:—

Example 1

This example illustrates the preparation of dichlor-dibenzanthrone by means of sulphuryl chloride and subsequent treatment of the dichlor-dibenzanthrone by ethylene glycol in the presence of an acid absorber.

According to this example, a dibenzanthronyl body is made by the method of Example 4 of British Patent No. 251313 and converted into a dibenzanthrone of a high degree of purity according to Example 5 of that specification.

This dibenzanthrone is then converted to a dichlor-benzanthrone, for instance according to Example 2 of British Patent No. 278834.

The dichlor-dibenzanthrone thus obtained is treated in nitro-benzene by ethylene glycol in the presence of an acid absorber, namely an alkaline carbonate and a metal in the following admixture:—

| | Parts by weight |
|---|---|
| Dichlor-dibenzanthrone | 2 |
| Nitro-benzene | 60 |
| Glycol | 5 |
| Potassium carbonate | 2 |
| Copper bronze | 0.1 |

This mixture is subjected to heat in an apparatus provided with a reflux condenser, for about 4 hours, during which time the colour of the solution, which is at the start bluish-violet with a reddish fluorescence, changes to a bright greenish-blue substantially devoid of fluorescence.

After this stage has been reached the solution may be filtered whilst hot, the residue extracted with nitrobenzene until substantially free of colouring matter, the combined filtrates reduced to about 25 parts in vacuo after which crystallization is permitted to take place.

The product thus obtained appears to be substantially free from halogen and to have the properties of the ethylene ether of dibenzanthrone of Example 10 of British Patent No. 193431.

It can be worked up into a colour by ordinary processes.

It appears principally to consist of the (12:12')-Bz2-Bz2'-ethylene ether of dibenzanthrone.

Example 2

The starting material of this example is dichlor-dibenzanthrone. This may be obtained by acting on the dibenzanthrone obtained by treating Bz1-Bz1'-dibenzanthronyl with caustic potash according to U. S. Patent 1607491 with chlorinating agents such as sulphuryl chloride in suspension in a solvent such as nitrobenzene at temperatures varying from 80° C. upwards, the chlorination being carried to the necessary stage in order to give a composition agreeing with the product desired.

1 part of dichlor-dibenzanthrone, (containing about 13.5 per cent. chlorine), 10 parts of nitrobenzene, 2 parts of potassium carbonate, 1 part of trimethylene glycol and 0.1 part of copper are heated together under a reflux condenser for 5 to 6 hours at 190–200° C. The mixture is at first a bluish red with powerful red fluorescence, ultimately changing to a bright violet blue devoid of fluorescence. When the reaction is complete the melt is cooled and filtered. The cake is freed from solvent by the usual methods and then yields about 1.1 parts of a violet blue powder. This powder dissolves in concentrated sulphuric acid to give a red violet solution. Partial dilution of this solution with water yields a greenish blue compound, while infinite dilution gives violet blue flocks. The solution in nitrobenzene is violet blue with red brown fluorescence. The solution in alkaline hydrosulphite is violet, dyeing cotton slightly reddish blue shades.

The product prepared by this example appears principally to consist of the Bz2-Bz2'-trimethylene ether of dibenzanthrone.

Example 3

1 part of glycerol is used to replace the 1 part of tri-methylene glycol used in the above example and the reaction carried out similarly. The colouring matter formed separates from the solution yielding about 1.12 parts of a violet blue powder. This body dissolves in concentrated sulphuric acid with a violet colour giving a greenish blue on partial dilution with water and violet blue flocks on infinite dilution. The solution in nitrobenzene is bluish red whilst hot and violet when cold with red brown fluorescence. It dissolves in alkaline hydrosulphite with a blue colour and dyes cotton reddish blue shades.

The product prepared by this example appears to contain the glycerol-ether Bz2-Bz2' of dibenzanthrone.

Example 4

The starting material of this example is tetrachlor-dibenzanthrone. It can be prepared by a process similar to that described in Example 2 for the production of dichlor-dibenzanthrone the chlorination being carried to the necessary stage in order to give a composition agreeing with the product desired.

1 part of tetra-chlor-dibenzanthrone (containing 23 per cent. chlorine), 10 parts of nitrobenzene, 1 part of ethylene glycol, 2 parts of potassium carbonate and 0.1 part of copper are mixed and refluxed for 4 hours at 190–200° C. at the end of which time the original violet blue melt has turned blue and has lost its fluorescence. The product is worked up by the usual methods and yields about 0.95 part of a violet blue powder containing still 12.5 per cent. chlorine, indicating that it is probably an ethylene ether of a dioxy-dichlor-dibenzanthrone. The substance dissolves in concentrated sulphuric acid with a violet colour giving on partial dilution a blue colour which is unchanged by infinite dilution giving blue flocks. The solution in nitrobenzene is reddish blue with red brown fluorescence. It dissolves in alkaline hydrosulphite with a blue colour, dyeing cotton blue shades which redden in artificial light.

The product of this example appears to contain two atoms of chlorine and consists apparently of the same product as that obtained by Example 1 with the exception of these two additional chlorine atoms the exact position of which in the structure is doubtful.

General

The above examples are given by way of illustration only, and modifications may be made, for instance, in place of potassium carbonate, sodium carbonate may be employed, but in that case we prefer to continue the reaction for a longer time.

Having now described our invention, what we claim as new and desire to secure by Letters Patent is:—

1. The process which consists in the condensation with material selected from the group consisting of ethylene and tri-methylene glycols of dibenzanthrones halogenated at least to the dichlor stage.

2. The process which consists in the condensation with material selected from the group consisting of ethylene and tri-methylene glycols of dichlor-dibenzanthrone.

3. The process which consists in the condensation of dichlor-dibenzanthrone with ethylene glycol.

4. The process which consists in the condensation of dichlor-dibenzanthrone with ethylene glycol in the presence of an alkaline carbonate and a metal.

5. The process which consists in the condensation of dichlor-dibenzanthrone with ethylene glycol in the presence of potassium carbonate and copper.

In testimony whereof we have signed our names to this specification.

ROBERT FRASER THOMSON.
JOHN THOMAS.